(12) United States Patent
Liu et al.

(10) Patent No.: US 12,332,808 B2
(45) Date of Patent: Jun. 17, 2025

(54) METHOD AND APPARATUS FOR SETTING MEMORY, AND ELECTRONIC DEVICE AND STORAGE MEDIUM

(71) Applicant: NETEASE (HANGZHOU) NETWORK CO., LTD., Zhejiang (CN)

(72) Inventors: Jingyang Liu, Zhejiang (CN); Yitao Yao, Zhejiang (CN); Yongbin Zou, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 376 days.

(21) Appl. No.: 17/760,005

(22) PCT Filed: May 29, 2020

(86) PCT No.: PCT/CN2020/093488
§ 371 (c)(1),
(2) Date: Aug. 3, 2022

(87) PCT Pub. No.: WO2021/212610
PCT Pub. Date: Oct. 28, 2021

(65) Prior Publication Data
US 2023/0060835 A1    Mar. 2, 2023

(30) Foreign Application Priority Data
Apr. 20, 2020  (CN) .................. 202010314151.X

(51) Int. Cl.
*G06F 12/109* (2016.01)
(52) U.S. Cl.
CPC ........ *G06F 12/109* (2013.01); *G06F 2212/65* (2013.01)

(58) Field of Classification Search
CPC ........ G06F 12/00; G06F 12/109; G06F 13/00; G06F 3/06
See application file for complete search history.

(56) References Cited

U.S. PATENT DOCUMENTS

| 6,219,770 | B1 | 4/2001 | Landau |
| 7,318,135 | B1 | 1/2008 | Tormasov et al. |
| (Continued) | | | |

FOREIGN PATENT DOCUMENTS

| CN | 1545033 A | 11/2004 |
| CN | 102308282 A | 1/2012 |
| (Continued) | | |

OTHER PUBLICATIONS

International Search Report dated Jan. 21, 2021 of PCT International Application No. PCT/CN2020/093488.
(Continued)

*Primary Examiner* — Tuan V Thai
(74) *Attorney, Agent, or Firm* — Qinghong Xu

(57) ABSTRACT

A method and apparatus for setting memory, and an electronic device and a storage medium. The method comprises: obtaining a memory application instruction generated by a process corresponding to a simulator; determining target number of times of mappings for a first virtual memory space according to the memory application instruction; determining remaining number of times of mappings of the first virtual memory space; determining whether the remaining number of times of mappings is zero; if not, mapping the first virtual memory space to a second virtual memory space by using a copy-on-write instruction, updating the remaining number of times of mappings, and returning to the step of determining whether the remaining number of times of mappings is zero; and if yes, stopping mapping the first (Continued)

virtual memory space to the second virtual memory space by using the copy-on-write instruction.

20 Claims, 4 Drawing Sheets

(56) References Cited

U.S. PATENT DOCUMENTS

| | | | |
|---|---|---|---|
| 9,507,947 B1* | 11/2016 | Dotan | G06F 21/554 |
| 9,672,052 B1 | 6/2017 | Berreth et al. | |
| 9,959,074 B1 | 5/2018 | Shain et al. | |
| 2013/0332660 A1 | 12/2013 | Talagala et al. | |
| 2014/0331224 A1* | 11/2014 | Robenko | G06F 12/1009 |
| | | | 718/1 |
| 2016/0026463 A1* | 1/2016 | Sundar | G06F 9/30032 |
| | | | 712/208 |
| 2023/0060835 A1* | 3/2023 | Liu | G06F 12/109 |

FOREIGN PATENT DOCUMENTS

| | | |
|---|---|---|
| CN | 103034591 A | 4/2013 |
| CN | 103092673 A | 5/2013 |
| CN | 105550123 A | 5/2016 |
| CN | 106155933 A | 11/2016 |
| CN | 109690505 A | 4/2019 |
| CN | 110336894 A | 10/2019 |
| CN | 110869913 A | 3/2020 |

OTHER PUBLICATIONS

Zhou, Xiao, Research and Implementation of Memory Deduplication in the Linux Desktop Environment, China Master's Theses Full-text Database, Feb. 15, 2014, ISSN: 1674-0246, pp. 6-10, 18, 35.

The First Office Action dated Jan. 27, 2021 of Chinese Patent No. 202010314151.X.

Li Huiling, Merger and Compression Algorithms for Memory Data, Mar. 31, 2016.

Notice of Allowance dated Apr. 2, 2021 of Chinese Patent No. 202010314151.X.

* cited by examiner

METHOD AND APPARATUS FOR SETTING MEMORY, AND ELECTRONIC DEVICE AND STORAGE MEDIUM

CROSS-REFERENCE

The present application is a National Stage of International Application No. PCT/CN2020/093488 filed on May 29, 2020, which claims the benefit of priority to Chinese Application No. 202010314151.X entitled "A method and apparatus for setting memory, an electronic device, and a storage medium" filed on Apr. 20, 2020, both the entire contents of which are incorporated herein by reference in their entireties for all purposes.

TECHNICAL FIELD

The present disclosure relates to the field of computers, and in particular, to a method and apparatus for setting memory, an electronic device, and a storage medium.

BACKGROUND

In the memory management of the operating system kernel, physical memory exists in the form of memory pages. Among them, there is a common phenomenon that there are a lot of the same contents in the memory, but they occupy different physical pages. For example, there are 10 physical pages whose contents are all 0. Although the contents are all 0, they occupy 10 physical pages of physical memory, which is obviously a waste. In order to solve this problem, in the Linux operating system, the kernel's memory deduplication mechanism (KSM, Kernel Samepage Merging) can merge the same page content into the same physical page, and only create a separate physical page when modification occurs.

While in the Windows system, there is also the problem of the same content but occupying different physical pages. At present, the KSM technology cannot be directly applied to the Windows system to solve this problem. Generally, the KSM technology is realized by simulating the Linux operating system completely. Due to the need to simulate the Linux operating system, it cannot be applied to many programs. Therefore, it is particularly important to simulate the application of KSM technology on the application layer, so as to reduce the memory occupation of the process.

SUMMARY

In view of the above problems, the present disclosure is proposed to provide a method and apparatus for setting memory, an electronic device, and a storage medium that overcome the above problems or at least partially solve the above problems.

According to an aspect of the present disclosure, there is provided a method for setting memory, which is applied to a simulator, where the simulator runs in the user space of a terminal device, the terminal device adopts a first operating system, and the simulator adopts a second operating system heterogeneous with the first operating system, and the method includes: obtaining a memory application instruction generated by a process corresponding to the simulator; determining target number of times of mappings for a first virtual memory space according to the memory application instruction; determining remaining number of times of mappings of the first virtual memory space; determining whether the remaining number of times of mappings is zero; if not, mapping the first virtual memory space to a second virtual memory space by using a copy-on-write instruction, updating the remaining number of times of mappings, and returning to the step of determining whether the remaining number of times of mappings is zero; if yes, stopping mapping the first virtual memory space to the second virtual memory space by using the copy-on-write instruction.

The present disclosure also provides an apparatus for setting memory, which is applied to a simulator, where the simulator runs in the user space of a terminal device, the terminal device adopts a first operating system, and the simulator adopts t a second operating system heterogeneous as the first operating system, and the device includes: an obtaining module, configured to obtain a memory application instruction generated by a process corresponding to the simulator; a target number of times of mappings determining module, configured to determine a target number of times of mappings for a first virtual memory space according to the memory application instruction; a remaining number of times of mappings determining module, configured to determine a remaining number of times of mappings of the first virtual memory space; a determining module, configured to map the first virtual memory space to a second virtual memory space by using a copy-on-write instruction, updating the remaining number of times of mappings, and returning to a step of determining whether the remaining number of times of mappings is zero, when it is determined that the remaining number of times of mappings is not zero; a stopping module, configured to stop mapping the first virtual memory space to the second virtual memory space by using the copy-on-write instruction, when it is determined that the remaining number of times of mappings is zero.

The present disclosure also provides an electronic device, including a processor, a memory, and computer programs stored on the memory and capable of running on the processor, where the computer programs are executed by the processor to implement the following steps: obtaining a memory application instruction generated by a process corresponding to the simulator; determining target number of times of mappings for a first virtual memory space according to the memory application instruction; determining remaining number of times of mappings of the first virtual memory space; determining whether the remaining number of times of mappings is zero; if not, mapping the first virtual memory space to a second virtual memory space by using a copy-on-write instruction, updating the remaining number of times of mappings, and returning to the step of determining whether the remaining number of times of mappings is zero; if yes, stopping mapping the first virtual memory space to the second virtual memory space by using the copy-on-write instruction.

The present disclosure also provides a computer-readable storage medium, where computer programs are stored on the computer-readable storage medium, and the computer programs are executed by a processor to implement the following steps: obtaining a memory application instruction generated by a process corresponding to the simulator; determining target number of times of mappings for a first virtual memory space, based on the memory application instruction; determining remaining number of times of mappings of the first virtual memory space; determining whether the remaining number of times of mappings is zero; if not, mapping the first virtual memory space to a second virtual memory space by using a copy-on-write instruction, updating the remaining number of times of mappings, and returning to the step of determining whether the remaining number of times of mappings is zero; if yes, stopping mapping the first virtual memory space to the second virtual memory space by using the copy-on-write instruction.

It should be understood that the above general description and the following detailed description are only exemplary and explanatory, and do not limit the present disclosure.

BRIEF DESCRIPTION OF THE DRAWINGS

In order to illustrate the technical solutions of the present disclosure more clearly, the following briefly introduces the accompanying drawings used in the description of the present disclosure. Obviously, the accompanying drawings in the following description are only some embodiments of the present disclosure. For those of ordinary skill in the art, other drawings can also be obtained from these drawings without creative labor.

DETAILED DESCRIPTION

In order to make the above objects, features and advantages of the present disclosure more clearly understood, the present disclosure will be described in further detail below with reference to the accompanying drawings and specific embodiments. Obviously, the described embodiments are some, but not all, embodiments of the present disclosure. Based on the embodiments of the present disclosure, all other embodiments obtained by those of ordinary skill in the art without creative efforts shall fall within the protection scope of the present disclosure.

Figure 1:
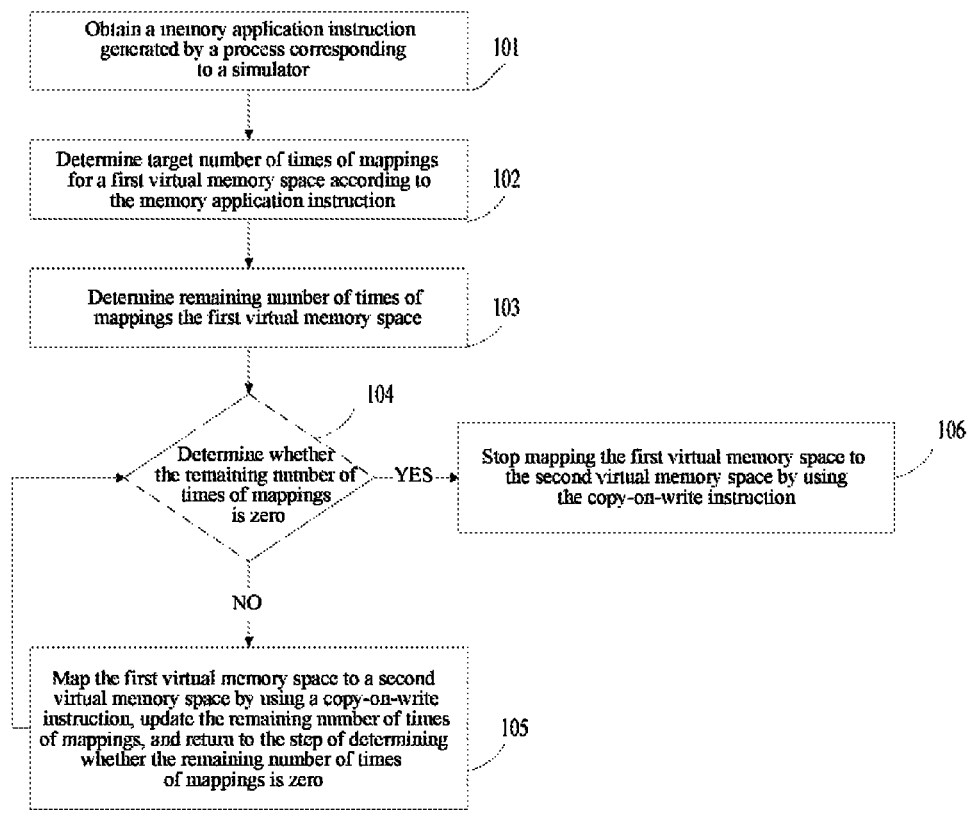
FIG. 1 is a flowchart of steps of a method for setting memory provided by an embodiment of the present disclosure.

Referring to FIG. 1, a flowchart of steps of a method for setting memory provided by an embodiment of the present disclosure is shown, which is applied to a simulator, where the simulator runs in the user space of a terminal device, and the terminal device adopts a first operating system, the simulator adopts a second operating system that is heterogeneous with the first operating system, and the method may specifically include the following steps.

Step 101, a memory application instruction generated by a process corresponding to the simulator is obtained.

All processes running in the terminal need to be executed by the physical memory space. If the running process occupies too much physical memory space, the physical memory space will be exhausted. In order to solve this problem, the virtual memory technology is used in the Windows system, that is, a part of the hard disk space is used as memory, and this part of the space is called virtual memory space. When the process is running, its code will not run all at the same time, but only the required part of the code will be run each time according to the current running situation of the process. Therefore, when the process starts, it will copy the code and data required for running from the disk to the virtual memory space, and then map the code and data required for running from the virtual memory space to the physical memory space in real time during the running process. The corresponding physical memory space is allocated for the data in the virtual memory space where the mapping is generated by the system, so that the process may run normally, and the data not required for running may be in the virtual memory space without consuming the physical memory space.

A simulator is an application that can run in the operating system running on the terminal. It can run an operating system that is different from the operating system running on the terminal. The process corresponding to the simulator can apply for virtual memory to the terminal by means of memory application instructions. After obtaining the memory application instruction, the terminal allocates the required virtual memory space to the process.

Step 102, target number of times of mappings for a first virtual memory space is determined according to the memory application instruction.

After the system obtains the memory application instruction generated by the process, it allocates the virtual memory space of the corresponding value to the process according to the virtual memory space value contained in the memory application instruction. The first virtual memory space is the virtual memory space created by the terminal system. In a 32-bit Windows system, the first virtual memory space may be 64 KB. According to the memory application instruction, the number of times that the first virtual memory space needs to be repeatedly mapped may be determined, so that the mapping relationship between the first virtual memory space and the virtual memory applied by the process in real time is established. For example, if the target number of times of mappings is 10, it means that the first virtual memory space needs to be mapped repeatly 10 times to the virtual memory space applied by the process in real time, so that the first virtual memory space may be extended and mapped to the virtual memory space applied by the entire process in real time. The virtual memory space applied by the process in real time refers to the virtual memory space that stores the code and data required for the current process running. The system allocates the required physical memory space for the process by mapping the virtual memory space applied in real time to the physical memory space.

Step 103, remaining number of times of mappings of the first virtual memory space is determined.

Step 104, whether the remaining number of times of mappings is zero is determined.

The remaining number of times of mappings is used to determine whether the operation of mapping the first virtual memory space to the virtual memory space applied by the process in real time is still required. After determining the remaining number of times of mappings, it is determined that whether the remaining number of times of mappings is zero or not.

Step 105, if not, the first virtual memory space is mapped to a second virtual memory space by using a copy-on-write instruction, the remaining number of times of mappings is updated, and the step of determining that whether the remaining number of times of mappings is zero is returned to.

When the system performs memory management, both the virtual memory space and the physical memory space exist in the form of memory pages. The virtual memory space value corresponding to each virtual memory page is at least 4 KB, and the physical memory space value corresponding to the physical memory page is also at least 4 KB. Copy-on-write (COW) refers to merging the same physical pages into one same physical page, and only when a modification occurs, a separate physical memory page is actually created.

Figure 2:
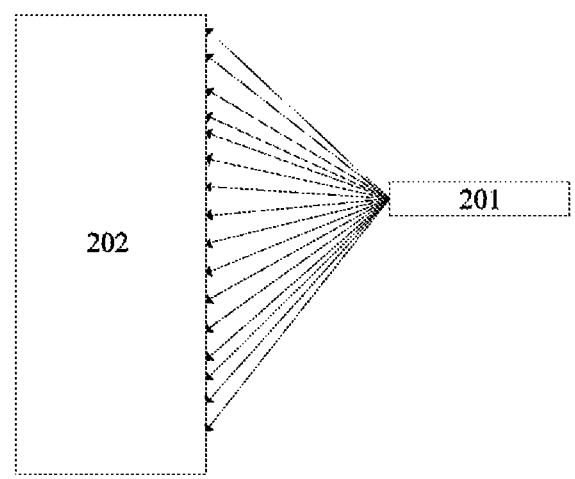
FIG. 2 is a schematic diagram of mapping of a virtual memory space provided by an embodiment of the present disclosure.

The second virtual memory space refers to the virtual memory space applied by the process in real time. The copy-on-write instruction is adopted, and the FILE_MAP_COPY function is used to map the first virtual memory space to the second virtual memory space, that is, the virtual memory page corresponding to the first virtual memory space is mapped to the virtual memory page corresponding to the second virtual memory space. After the mapping is completed, the current remaining number of times of mappings is decremented by one, and the determined remaining number of times of mappings is updated, and the process is repeated until the remaining number of times of mappings is zero. When the remaining number of times of mappings is zero, it means that the first virtual memory space has been extended and mapped to the entire second virtual memory space. As shown in FIG. 2, 201 is the first virtual memory space with a virtual memory space value of 64 KB, and 202 is the second virtual memory space with a virtual memory space value of 1024 KB. The first virtual memory space is mapped 16 times, and is extended and mapped to the entire second virtual memory space.

Step 106, if yes, the first virtual memory space is mapped to the second virtual memory space by using the copy-on-write instruction.

If it is determined that the remaining number of times of mappings is zero, that is, the first virtual memory space has been extended and mapped to the entire second virtual memory space, the mapping operation is stopped. At this time, due to the mapping relationship established between the first virtual memory space and the second virtual memory space, the system only establishes a mapping relationship between the virtual memory page corresponding to the first virtual memory space and the physical memory page corresponding to the physical memory space. That is, the system only allocates the physical memory space equal to the first virtual memory space value to the process. When the physical memory space value used by the process exceeds the virtual memory space value of the first virtual memory space, the system then allocates new physical memory space to the process in real time.

In some embodiments of the present disclosure, a memory application instruction generated by a process corresponding to the simulator is obtained, the target number of times of mappings for the first virtual memory space is determined according to on the memory application instruction, the remaining number of times of mappings of the first virtual memory space is determined, and it is determined whether the remaining number of times of mappings is zero or not. If the remaining number of times of mappings is not zero, the first virtual memory space is mapped to a second virtual memory space by using a copy-on-write instruction, the remaining number of times of mappings is updated, and it is determined again whether the remaining number of times of mappings is zero or not. If the remaining number of times of mappings is zero, the first virtual memory space is stopped mapping to the second virtual memory space by using the copy-on-write instruction. By extending and mapping the first virtual memory space with a smaller virtual memory space value to the larger second virtual memory space required for running of the process, the physical memory space allocated by the system according to the virtual memory space is reduced, and less virtual memory is used. The memory space may meet the requirements of process operation, reduce the physical memory occupation of the process, and realize the simulated application of the KSM technology of the Linux system on the application layer of the Windows system, without simulating the entire Linux system.

Figure 3:
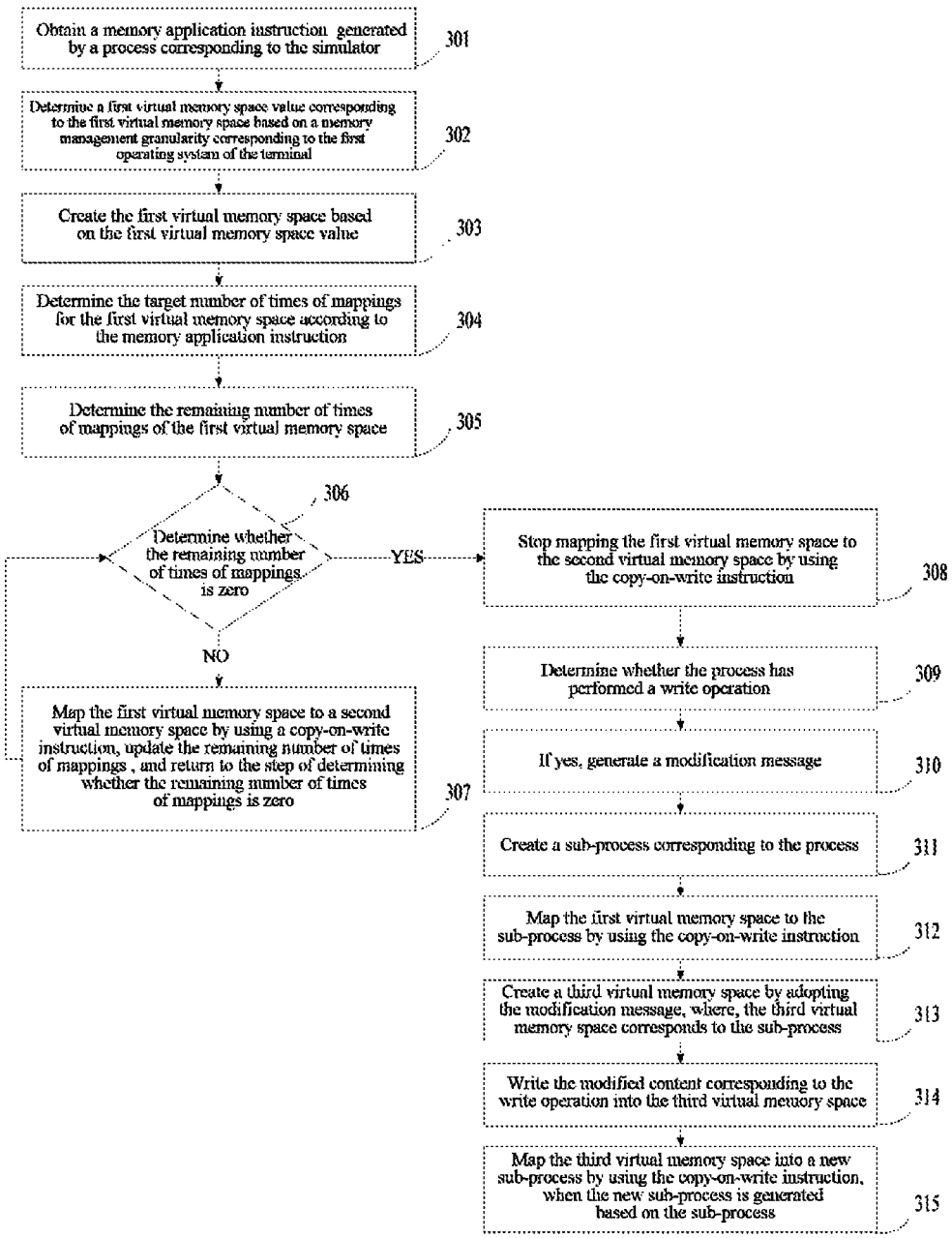
FIG. 3 is a flowchart of steps of another method for setting memory provided by an embodiment of the present disclosure.

Referring to FIG. 3, a flowchart of steps of another method for setting memory provided by an embodiment of the present disclosure is shown, which is applied to a simulator, where the simulator runs in the user space of a terminal device, and the terminal device adopts a first operation system, the simulator adopts a second operating system that is heterogeneous with the first operating system, and the method may specifically include the following steps.

Step 301, a memory application instruction generated by a process corresponding to the simulator is obtained.

Since this step is similar to step 101, reference may be made to step 101 for a detailed description, and thus will not be repeated here.

Step 302: a first virtual memory space value corresponding to the first virtual memory space is determined based on a memory management granularity corresponding to the first operating system of the terminal In a terminal system, the virtual memory space value of the virtual memory space allocated by the system to a process each time is a multiple of the specified value, which is called the memory management granularity. For example, in a 32-bit Windows system, the virtual memory space allocated by the system to a process is a multiple of 64 KB each time. If the process applies for 110 KB of virtual memory space, the system will allocate 128 KB of virtual memory space for it. 64 KB is the memory management granularity.

To implement the mapping, the first virtual memory space value corresponding to the first virtual memory space is not less than the memory management granularity. For example, in a 32-bit Windows system, the first virtual memory space value may be 64 KB.

Step 303, the first virtual memory space based on the first virtual memory space value is created.

Based on the determined first virtual memory space value, the system creates a corresponding first virtual memory space.

Step 304: the target number of times of mappings for the first virtual memory space is determined according to the memory application instruction.

In a preferred embodiment of the present disclosure, step 304 further includes the following sub-steps:
a second virtual memory space value corresponding to the second virtual memory space is extracted from the memory application instruction extracting;
the target number of times of mappings for the first virtual memory space is determined using the second virtual memory space value and the first virtual memory space value, where, the first virtual memory space value corresponds to the first virtual memory space.

During the running of the process, its code is run in segments, and the memory application instruction includes the virtual memory space value of the virtual memory space occupied by the part of the code that needs to be run at present, that is, the second virtual memory space value. By using the second virtual memory space value and the first virtual memory space value, the number of times of mappings required for the first virtual memory space to be extended and mapped to the entire second virtual memory space value may be calculated. For example, the second virtual memory space value is 1 MB, the first virtual memory space value is 64 KB, and 1 MB is equal to 1024 KB. Therefore, 16 may be obtained by 1024/64, that is, the target number of times of mappings is 16.

Step 305, the remaining number of times of mappings of the first virtual memory space is determined.

Step 306, whether the remaining number of times of mappings is zero is determined.

Step 307, if not, the first virtual memory space is mapped to a second virtual memory space by using a copy-on-write instruction, the remaining number of times of mappings is updated, and the step of determining that whether the remaining number of times of mappings is zero is returned to.

Step 308, if yes, the first virtual memory space is stopped mapping to the second virtual memory space by using the copy-on-write instruction.

Since steps 305-308 are similar to steps 103-106 in the previous embodiment, reference may be made to steps 103-106 for detailed description, and details are not repeated here.

Step 309, whether the process has performed a write operation is determined.

Step 310, if yes, a modification message is generated.

In the Linux system, the fork function may be called to create a sub-process of the process. At this time, in order to save the occupation of physical memory, the code and data corresponding to the parent process is not copied to the sub-process directly, but a mapping relationship is established between the parent process and the sub-process. So that, when viewing the content of the sub-process, what the user actually sees is the content of the parent process. When the user writes to the sub-process, that is, the modification of the content corresponding to the sub-process, such as the value of the function, is made, the system will actually allocate physical memory space for the sub-process to store the code and data corresponding to the parent process.

In the Windows system, when simulating the fork function under the Linux system, the FILE_MAP_COPY function uses the physical memory space with a physical memory space value of 4 KB to allocate the physical memory space for the sub-process, when adopting the write operation. Therefore, if only adopting the DuplicateHandle function it is not able to map the content of the parent process to the sub-process. It is necessary to check the mapping status of the first virtual memory space by means of the VirtualQuery function to determine whether a write operation has occurred or not. If yes, it indicates that the content of the process has changed.

Step 311, a sub-process corresponding to the process is created.

The fork function under the Linux system is simulated, a sub-process corresponding to the process is created, and the sub-process does not contain code and data corresponding to the parent process.

Step 312, the first virtual memory space is mapped to the sub-process by using the copy-on-write instruction.

By using the copy-on-write instruction, the data and code of the process contained in the first virtual memory space are mapped to the sub-process. When viewing the sub-process, the user may view the data and code of the parent process by means of the mapping.

Step 313, a third virtual memory space is created by adopting the modification message, where, the third virtual memory space corresponds to the sub-process.

According to the modification message, the system is informed that a write operation has occurred in the process, so a third virtual memory space is created in the sub-process.

Step 314, the modified content corresponding to the write operation is written into the third virtual memory space.

Step 315, the third virtual memory space is mapped into a new sub-process by using the copy-on-write instruction, when the new sub-process is generated based on the sub-process.

The system writes part of the content corresponding to the write operation that occurs in the process into the third virtual memory space of the sub-process. When the sub-process regenerates a sub-process, generally the sub-process needs to be read only at this time, so the copy-on-write instruction may be adopted directly to map the third virtual memory space to the newly generated sub-process. When reading the content of the sub-process generated by the sub-process, the user may also read part of the content that has been written. This makes it unnecessary to copy all the code and data in the process into the sub-process when creating the sub-process, only the changed content needing to be copied.

In some embodiments of the present disclosure, it is determined whether the process has performed a write operation or not, and if so, a modification message is generated. When a sub-process is created, a copy-on-write instruction is adopted to map the first virtual memory space to the sub-process, and the modification message is used to create the third virtual memory space corresponding to the sub-process. The modified content corresponding to the write operation is written into the third virtual memory space. When a new sub-process is generated based on the sub-process, the copy-on-write instruction is adopted to map the third virtual memory space into the new sub-process, so that when the sub-process is generated, it is not necessary to copy all the code and data corresponding to the parent process to the sub-process, but only the changed content needs to be copied, reducing the physical memory and CPU resources occupied by copying the code and data corresponding to the process, and improving the performance of the terminal.

In order to enable those skilled in the art to better understand the solution of the present disclosure, the present application is exemplified by examples below, but it should be understood that the present application is not limited thereto.

In the virtual memory space of the game process, there is a special part called the stack. Most of the contents of a stack are 0. For example, a stack occupying 1 MB of virtual memory space, in most cases, only dozens of KB are of available content, and the rest are zero. Since the stack needs to be used in the context of the kernel and must be initialized, the stack occupies a large amount of physical memory fixedly when applying for physical memory. For example, one hundred threads may generate zero content parts that occupy nearly 100 MB of physical memory space, wasting a lot of physical memory space.

Another situation is anonymous shared memory in the process, which is widely used on Android. The usage characteristics of the anonymous shared memory is that the initialization content is required to be 0 after the map function is adopted, which results in many physical memory pages with zero content, and physical memory pages may also be merged.

When the stack of the game process applies to the system for 1 MB of virtual memory space, since the depth of the stack is not deep, only 64 KB of virtual memory space is actually needed at present. In the 32-bit Windows systems, 64 KB is the virtual memory space value of a virtual memory page, as well as physical memory pages. But the stack requires that other virtual memory pages in 1 MB are also available. After the system allocates a second virtual memory space of 1 MB to the stack, it creates a first virtual memory space with a virtual memory value of 64 KB. The system maps the first virtual memory space to the second virtual memory space by using g the copy-on-write instruction. After 16 times of repeated mapping, the first virtual memory space has been extended and mapped to the entire second virtual memory space. Since the mapping method is adopted, the system establishes the mapping between the virtual memory space of the process and the physical memory space according to the first virtual memory space, that is, allocates 64 KB of physical memory space to the process. When a write operation occurs in the process, and the virtual memory space value of the virtual memory to be used by the stack exceeds the virtual memory space value of the first virtual memory space, based on the copy-on-write instruction, the system re-allocates the physical memory space for the process, that is, the physical memory page is generated. For example, the virtual memory space value that the stack needs to use is 95 KB, which exceeds 64 KB of the first virtual memory space value, so the system will allocate another physical page for the process; when the virtual memory space value that the stack needs to use increases to 158 KB, the system will then allocate a physical page to the process to satisfy the use of the stack.

During the entire setting memory process, by simulating the KSM technology of the Linux system and using a smaller virtual memory, the process's demand for a larger virtual memory may be met, thereby reducing the physical memory occupation of the process and improving the resource usage efficiency. of the terminal.

Figure 4:
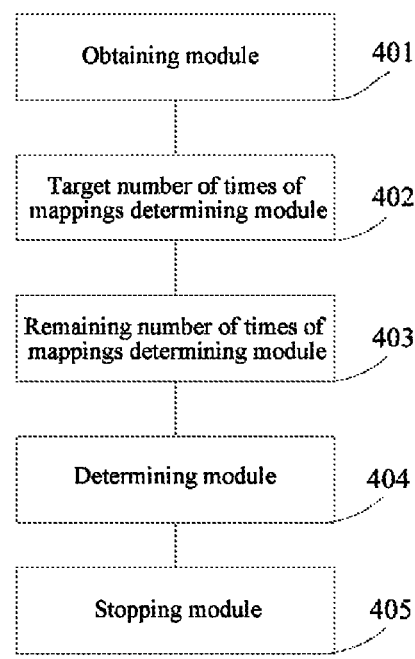
FIG. 4 is a structural block diagram of an apparatus for setting memory provided by an embodiment of the present disclosure.

Referring to FIG. 4, it shows a structural block diagram of an apparatus for setting memory provided by an embodiment of the present disclosure, which is applied to a simulator, where the simulator runs in the user space of a terminal device, and the terminal device adopts a first operating system, the simulator adopts a second operating system that is heterogeneous with the first operating system, and the device may include the following modules:

an obtaining module 401, configured to obtain a memory application instruction generated by a process corresponding to the simulator;

a target number of times of mappings determining module 402, configured to determine a target number of times of mappings for the first virtual memory space according to the memory application instruction;

a remaining number of times of mappings determining module 403, configured to determine a remaining number of times of mappings of the first virtual memory space;

a determining module 404, configured to map the first virtual memory space to a second virtual memory space by using a copy-on-write instruction, updating the remaining number of times of mappings, and returning to a step of determining whether the remaining number of times of mappings is zero, when it is determined that the remaining number of times of mappings is not zero;

a stopping module 405, configured to stop mapping the first virtual memory space to the second virtual memory space by using the copy-on-write instruction, when it is determined that the remaining number of times of mappings is zero.

In an embodiment of the present disclosure, the device further includes:

a first virtual memory space value determining module, configured to determine a first virtual memory space value corresponding to the first virtual memory space based on a memory management granularity corresponding to the first operating system of the terminal;

a creating module, configured to create the first virtual memory space based on the first virtual memory space value.

In an embodiment of the present disclosure, the target number of times of mappings determining module 402 further includes the following sub-modules:

an extraction submodule, configured to extract a second virtual memory space value corresponding to the second virtual memory space from the memory application instruction;

a determination submodule, configured to determine the target number of times of mappings for the first virtual memory space using the second virtual memory space value and the first virtual memory space value, where, the first virtual memory space value corresponds to the first virtual memory space.

In an embodiment of the present disclosure, the device further includes:

a sub-process module, configured to create a sub-process corresponding to the process;

a first virtual memory space mapping submodule, configured to map the first virtual memory space to the sub-process by using the copy-on-write instruction.

In an embodiment of the present disclosure, the device further includes:

a write operation determining sub-module, configured to determine whether the process has performed a write operation;

a modification message submodule, configured to generate a modification message.

In an embodiment of the present disclosure, the device further includes:

a third virtual memory space submodule, configured to create a third virtual memory space by adopting the modification message; where, the third virtual memory space corresponds to the sub-process;

a write submodule, configured to write the modified content corresponding to the write operation into the third virtual memory space.

In an embodiment of the present disclosure, the device further includes:

a third virtual memory space mapping submodule, configured map the third virtual memory space into a new sub-process by using the copy-on-write instruction, when the new sub-process is generated based on the sub-process.

As for the apparatus embodiment, since it is basically similar to the method embodiment, the description is relatively simple, and reference may be made to the partial description of the method embodiment for related parts.

An embodiment of the present disclosure also provides an electronic device, which may include a processor, a memory, and a computer program stored in the memory and capable of running on the processor. When the computer program is executed by the processor, the steps of the above method for setting memory are implemented.

An embodiment of the present disclosure further provides a computer-readable storage medium on which a computer program is stored, and when the computer program is executed by a processor, the steps of the above method for setting memory are implemented.

The various embodiments in the present disclosure are described in a progressive manner, and each embodiment focuses on the differences from other embodiments, and the same and similar parts between the various embodiments may be referred to each other.

It should be understood by those skilled in the art that the embodiments of the embodiments of the present disclosure may be provided as a method, an apparatus, or a computer program product. Accordingly, embodiments of the present disclosure may take the form of an entirely hardware embodiment, an entirely software embodiment, or an embodiment combining software and hardware aspects. Furthermore, embodiments of the present disclosure may take the form of a computer program product implemented on one or more computer-usable storage medium having computer-usable program code embodied therein, including but not limited to disk storage, CD-ROM, optical storage, and the like.

Embodiments of the present disclosure are described with reference to flowcharts and/or block diagrams of methods, terminal devices (systems), and computer program products according to embodiments of the present disclosure. It should be understood that each flow and/or block in the flowcharts and/or block diagrams, and combinations of flows and/or blocks in the flowcharts and/or block diagrams, may be implemented by computer program instructions. These computer program instructions may be provided to the processor of a general purpose computer, special purpose computer, embedded processor or other programmable data processing terminal equipment to produce a machine, such that the instructions to be executed by the processor of the computer or other programmable data processing terminal equipment result in an apparatus for implementing the functions specified in one or more flows of the flowcharts and/or one or more blocks of the block diagrams.

These computer program instructions may also be stored in a computer readable memory capable of directing a computer or other programmable data processing terminal equipment to operate in a particular manner, such that the instructions stored in the computer readable memory result in an article of manufacture comprising instruction device, the instruction device implement the functions specified in one or more flows of the flowcharts and/or the one or more blocks of the block diagrams.

These computer program instructions may also be loaded on a computer or other programmable data processing terminal equipment, so that a series of operational steps are performed on the computer or other programmable terminal equipment to produce a computer-implemented process, thereby the instructions executing on the computer or other programmable terminal equipment provide steps for implementing the functions specified in one or more flows of the flowcharts and/or the one or more blocks of the block diagrams.

Although preferred embodiments of the embodiments of the present disclosure have been described, additional changes and modifications to these embodiments may be made by those skilled in the art once being informed of the basic inventive concepts. Therefore, the appended claims are intended to be construed to include the preferred embodiments as well as all changes and modifications that fall within the scope of the embodiments of the present disclosure.

Finally, it should also be noted that in this document, relational terms such as first and second are used only to distinguish one entity or operation from another, and do not necessarily require or imply these entities or there is any such actual relationship or sequence between operations. Moreover, the terms "comprising", "including" or any other variation thereof are intended to encompass non-exclusive inclusion such that a process, method, article or terminal device that includes a list of elements includes not only those elements, but also a non-exclusive list of other elements, or also includes elements inherent to such a process, method, article or terminal equipment. Without further limitation, an element defined by the phrase "comprises a . . . " does not preclude the presence of additional identical elements in the process, method, article or terminal device comprising said element.

The method and apparatus for setting memory, an electronic device, and a storage medium provided by the present disclosure have been described above in detail. In this paper, specific examples are used to illustrate the principles and implementations of the present disclosure. The descriptions of the above embodiments are only used to help understand the method of the present disclosure and its core concept; at the same time, for those skilled in the art, according to the concept of the present disclosure, there will be changes in the specific embodiments and application scope. To sum up, the contents of the description should not be construed as limiting the present disclosure.

What is claimed is:

1. A method for setting memory, wherein, the method is applied to a simulator, the simulator runs in user space of a terminal device, the terminal device adopts a first operating system, the simulator adopts a second operating system heterogeneous with the first operating system, and the method comprises:
   obtaining a memory application instruction generated by a process corresponding to the simulator;
   determining target number of times of mappings for a first virtual memory space according to the memory application instruction;
   determining remaining number of times of mappings of the first virtual memory space;
   determining whether the remaining number of times of mappings is zero;
   in response to the remaining number of times of mappings not being zero, mapping the first virtual memory space to a second virtual memory space by using a copy-on-write instruction, updating the remaining number of times of mappings, and returning to the step of determining whether the remaining number of times of mappings is zero;
   in response to the remaining number of times of mappings being zero, stopping the mapping the first virtual memory space to the second virtual memory space by using the copy-on-write instruction.

2. The method according to claim 1, wherein the method further comprises:
   determining a first virtual memory space value corresponding to the first virtual memory space based on a memory management granularity corresponding to the first operating system of the terminal;
   creating the first virtual memory space based on the first virtual memory space value.

3. The method according to claim 2, wherein the step of determining the target number of times of mappings for the first virtual memory space according to the memory application instruction comprises:
   extracting a second virtual memory space value corresponding to the second virtual memory space from the memory application instruction;
   determining the target number of times of mappings for the first virtual memory space using the second virtual memory space value and the first virtual memory space value, wherein, the first virtual memory space value corresponds to the first virtual memory space.

4. The method according to claim 3, wherein, the first virtual memory space value is smaller, and the second virtual memory space value is larger.

5. The method according to claim 4, wherein, the second virtual memory space value corresponds to a virtual memory space value of a virtual memory space occupied by part of code needed to be run by the process at present.

6. The method according to claim 1, further comprising:
creating a sub-process corresponding to the process;
mapping the first virtual memory space to the sub-process by using the copy-on-write instruction.

7. The method according to claim 6, wherein the method further comprises:
determining whether the process has performed a write operation;
in response to determining that the process has performed a write operation, generating a modification message.

8. The method according to claim 7, wherein the method further comprises:
creating a third virtual memory space by using the modification message; wherein, the third virtual memory space corresponds to the sub-process;
writing a modified content corresponding to the write operation into the third virtual memory space.

9. The method according to claim 8, wherein the method further comprises:
mapping, in response to generating a new sub-process based on the sub-process, the third virtual memory space into the new sb-process by using the copy-on-write instruction.

10. The method according to claim 1, wherein, the first virtual memory space refers to a virtual memory space created by the first operating system; and the second virtual memory space refers to a virtual memory space applied by the process in real time.

11. An electronic device, wherein, the electronic device comprises a processor, a memory, and a computer program stored on the memory and capable of running on the processor, the computer program being executed by the processor to implement following steps:
obtaining a memory application instruction generated by a process corresponding to the simulator;
determining target number of times of mappings for a first virtual memory space according to the memory application instruction;
determining remaining number of times of mappings of the first virtual memory space;
determining whether the remaining number of times of mappings is zero;
in response to the remaining number of times of mappings not being zero, mapping the first virtual memory space to a second virtual memory space by using a copy-on-write instruction, updating the remaining number of times of mappings, and returning to the step of determining whether the remaining number of times of mappings is zero;
in response to the remaining number of times of mappings being zero, stopping the mapping the first virtual memory space to the second virtual memory space by using the copy-on-write instruction.

12. The electronic device according to claim 11, wherein, the computer program is executed by the processor to further implement following steps:
determining a first virtual memory space value corresponding to the first virtual memory space based on a memory management granularity corresponding to the first operating system of the terminal;
creating the first virtual memory space based on the first virtual memory space value.

13. The electronic device according to claim 12, wherein, the step of determining the target number of times of mappings for the first virtual memory space according to the memory application instruction comprises:
extracting a second virtual memory space value corresponding to the second virtual memory space from the memory application instruction;
determining the target number of times of mappings for the first virtual memory space using the second virtual memory space value and the first virtual memory space value, wherein, the first virtual memory space value corresponds to the first virtual memory space.

14. The electronic device according to claim 11, wherein, the computer program is executed by the processor to further implement following steps:
determining whether the process has performed a write operation;
in response to determining that the process has performed a write operation, generating a modification message;
creating a sub-process corresponding to the process;
mapping the first virtual memory space to the sub-process by using the copy-on-write instruction.

15. The electronic device according to claim 14, wherein, the computer program is executed by the processor to further implement following steps:
creating a third virtual memory space by using the modification message; wherein, the third virtual memory space corresponds to the sub-process;
writing a modified content corresponding to the write operation into the third virtual memory space;
mapping, in response to generating a new sub-process based on the sub-process, the third virtual memory space into the new sub-process by using the copy-on-write instruction.

16. A computer-readable storage medium, wherein, a computer program is stored on the computer-readable storage medium, the computer program being executed by the processor to implement following steps:
obtaining a memory application instruction generated by a process corresponding to the simulator;
determining target number of times of mappings for a first virtual memory space according to the memory application instruction;
determining remaining number of times of mappings of the first virtual memory space;
determining whether the remaining number of times of mappings is zero;
in response to the remaining number of times of mappings not being zero, mapping the first virtual memory space to a second virtual memory space by using a copy-on-write instruction, updating the remaining number of times of mappings, and returning to the step of determining whether the remaining number of times of mappings is zero;
in response to the remaining number of times of mappings being zero, stopping the mapping the first virtual memory space to the second virtual memory space by using the copy-on-write instruction.

17. The computer-readable storage medium according to claim 16, wherein, the computer program is executed by the processor to further implement following steps:
determining a first virtual memory space value corresponding to the first virtual memory space based on a memory management granularity corresponding to the first operating system of the terminal;

creating the first virtual memory space based on the first virtual memory space value.

18. The computer-readable storage medium according to claim 17, wherein, the step of determining the target number of times of mappings for the first virtual memory space according to the memory application instruction comprises:

extracting a second virtual memory space value corresponding to the second virtual memory space from the memory application instruction;

determining the target number of times of mappings for the first virtual memory space using the second virtual memory space value and the first virtual memory space value, wherein, the first virtual memory space value corresponds to the first virtual memory space.

19. The computer-readable storage medium according to claim 16, wherein, the computer program is executed by the processor to further implement following steps:

determining whether the process has performed a write operation;

in response to determining that the process has performed a write operation, generating a modification message;

creating a sub-process corresponding to the process;

mapping the first virtual memory space to the sub-process by using the copy-on-write instruction.

20. The computer-readable storage medium according to claim 19, wherein, the computer program is executed by the processor to further implement following steps:

creating a third virtual memory space by using the modification message; wherein, the third virtual memory space corresponds to the sub-process;

writing a modified content corresponding to the write operation into the third virtual memory space;

mapping, in response to generating a new sub-process based on the sub-process, the third virtual memory space into the new sub-process by using the copy-on-write instruction.

\* \* \* \* \*